United States Patent
Albright

(10) Patent No.: US 10,900,278 B1
(45) Date of Patent: *Jan. 26, 2021

(54) CABINET DOOR ASSEMBLY AND MANUFACTURING THEREOF

(71) Applicant: DECORE-ATIVE SPECIALTIES INC., Monrovia, CA (US)

(72) Inventor: Jack Laurence Albright, Elk Grove, CA (US)

(73) Assignee: DECORE-ATIVE SPECIALTIES, INC., Monrovia, CA (US)

( * ) Notice: Subject to any disclaimer, the term of this patent is extended or adjusted under 35 U.S.C. 154(b) by 19 days.

This patent is subject to a terminal disclaimer.

(21) Appl. No.: 15/820,041

(22) Filed: Nov. 21, 2017

Related U.S. Application Data

(63) Continuation of application No. 14/970,424, filed on Dec. 15, 2015, now Pat. No. 9,845,637.

(51) Int. Cl.
*E06B 3/70* (2006.01)
*E06B 3/74* (2006.01)
(Continued)

(52) U.S. Cl.
CPC .............. *E06B 3/7001* (2013.01); *B32B 3/14* (2013.01); *B32B 21/13* (2013.01); *E06B 3/74* (2013.01);
(Continued)

(58) Field of Classification Search
CPC ..... E06B 3/72; E06B 3/74; E06B 3/76; E06B 3/78; E06B 3/7001; E06B 3/7003;
(Continued)

(56) References Cited

U.S. PATENT DOCUMENTS 2,457,964 A    1/1949    Mccord
4,901,493 A    2/1990    Thorn
(Continued)

FOREIGN PATENT DOCUMENTS

CA    2803637 A1    7/2013

OTHER PUBLICATIONS

Non-Final Office action for U.S. Appl. No. 14/970,424 dated May 8, 2017.
(Continued)

*Primary Examiner* — Jessica L Laux
(74) *Attorney, Agent, or Firm* — Concept IP LLP; Pejman Yedidsion

(57) ABSTRACT

A cabinet door having a first member with a first recess disposed along a top side of the center panel between a first stile and a second stile, a second recess disposed along a bottom side of the center panel between the first stile and the second stile, and a first veneer having a longitudinally extending grain pattern; a second member with a second veneer having a longitudinally extending grain pattern, and a first rabbet; and a third member with a third veneer having a longitudinally extending grain pattern; and a second rabbet; where the second member fits into the first recess, the third member fits into the second recess, and the longitudinally extending grain pattern of the second veneer is parallel to the longitudinally extending grain pattern of the third veneer and perpendicular to the longitudinally extending grain pattern of the first veneer.

19 Claims, 8 Drawing Sheets

(51) Int. Cl.
*B32B 21/13* (2006.01)
*B32B 3/14* (2006.01)

(52) U.S. Cl.
CPC ... *B32B 2419/00* (2013.01); *E06B 2003/7051* (2013.01); *E06B 2003/7067* (2013.01)

(58) Field of Classification Search
CPC .............. E06B 3/7005; E06B 3/7007; E06B 2003/7011; E06B 2003/7013; E06B 2003/7021; E06B 2003/7049; E06B 2003/7051; E06B 2003/7059; E06B 2003/7061; E06B 2003/7067; E06B 2003/7069; E06B 2003/7071; E06B 2003/7086; E06B 2003/7088; E06B 2003/709; E06B 2003/7092; B23B 3/18
See application file for complete search history.

(56) References Cited

U.S. PATENT DOCUMENTS

| | | | | |
|---|---|---|---|---|
| 5,526,857 A | * | 6/1996 | Forman | B27M 3/0093 144/346 |
| 5,540,026 A | * | 7/1996 | Gartland | B27M 3/0093 156/245 |
| 8,763,334 B2 | * | 7/2014 | O'Neill | E06B 3/7001 52/455 |
| 2004/0111993 A1 | * | 6/2004 | Hollman | B27D 5/003 52/384 |
| 2013/0052388 A1 | | 2/2013 | Burrows et al. | |

OTHER PUBLICATIONS

Notice of Allowance for U.S. Appl. No. 14/970,424 dated Aug. 30, 2017.
Restriction Requirement for U.S. Appl. No. 14/970,424 dated Feb. 10, 2017.

* cited by examiner

CABINET DOOR ASSEMBLY AND MANUFACTURING THEREOF

CROSS-REFERENCE TO RELATED APPLICATIONS

This application is a continuation of U.S. patent application Ser. No. 14/970,424, filed Dec. 15, 2015, which is hereby incorporated herein by reference in its entirety for all purposes.

TECHNICAL FIELD

Embodiments relate generally to cabinet door construction, and more particularly to cabinet doors having a veneer.

BACKGROUND

Existing cabinet doors having a veneer, make it readily apparent to a user that the cabinet door is not constructed from wood. Single surface cabinet doors have a veneer pattern that does not change over various surface features such as panels, rails, and stiles. Additionally, the veneer is susceptible to bridging in corners created by these surface features, which create rounded shapes that further distort the veneer appearance. Multiple surface cabinet doors rely on assembling multiple pieces that have a veneer applied over each entire respective surface. Due to bridging effects from surface features, and variability from piece to piece of the amount of bridging, assembling such multiple surface cabinet doors results in pieces that form an inconsistent look and/or fit. The variability of the bridging from each veneer ensures that a consistent assembly and look is impractical and results in an overall low quality look that is impractical for large-scale production.

SUMMARY

Exemplary embodiments may include a cabinet door assembly comprising: a first member, the first member comprising: a center panel; a first stile disposed longitudinally along a left side of the center panel; a second stile disposed longitudinally along a right side of the center panel; a first recess disposed along a top side of the center panel between the first stile and the second stile; a second recess disposed along a bottom side of the center panel between the first stile and the second stile; and a first veneer having a longitudinally extending grain pattern, where the first veneer may cover the center panel, the first stile, and the second stile, and where the first recess and the second recess may not be covered by the first veneer. The cabinet door assembly may also comprise a second member, the second member comprising: a first rail; a second veneer having a longitudinally extending grain pattern; and a first rabbet disposed on a back surface along a bottom edge of the first rail. Additionally, the cabinet door assembly may comprise a third member, the third member comprising: a second rail; a third veneer having a longitudinally extending grain pattern; and a second rabbet disposed on a back surface along a top edge of the second rail; where the second member may fit into the first recess, where the third member may fit into the second recess, and where the longitudinally extending grain pattern of the second veneer may be parallel to the longitudinally extending grain pattern of the third veneer and perpendicular to the longitudinally extending grain pattern of the first veneer.

In one embodiment of the cabinet door assembly, the first member may further comprise: a first profile disposed longitudinally along a portion of the right edge of the first stile between the first recess and the second recess, where the top and bottom of the first profile may be beveled; and a second profile disposed longitudinally along a portion of the left edge of the second stile between the first recess and the second recess, where the top and bottom of the second profile may be beveled. The first veneer of the cabinet door assembly may further cover the first profile and the second profile. Additionally, the second member of the cabinet door assembly may further comprise: a third profile disposed longitudinally along a bottom edge of the first rail, where the left and right of the third profile may be beveled and the third member of the cabinet door assembly may further comprise: a fourth profile disposed longitudinally along a top edge of the second rail, where the left and right of the fourth profile may be beveled. In addition, the beveled left edge of the third profile of the cabinet door assembly may form a miter with the beveled top edge of the first profile, the beveled right edge of the third profile forms a miter with the beveled top edge of the second profile, the beveled left edge of the fourth profile forms a miter with the beveled bottom edge of the first profile, and the beveled right edge of the fourth profile forms a miter with the beveled bottom edge of the second profile.

In another embodiment, the first member, the second member, and the third member of the cabinet door assembly may each be selected from at least one of: medium-density fibreboard (MDF), particleboard, and plywood, where the back surface of the second member may be affixed to the first recess by an adhesive, and where the back surface of the third member may be affixed to the second recess by the adhesive. Further, the adhesive of the cabinet door assembly may form a direct MDF to MDF bond or a bond between materials selected from at least one of: plywood, plastic, and wood.

Other exemplary embodiments of the cabinet door assembly may have the first rail be beveled back where the beveled back may be an edge of the assembly that is not perpendicular to the top surface of the first stile and the top surface of the second stile. Additionally, the second rail of the cabinet door assembly may be beveled back where the beveled back may be an edge of the assembly that is not perpendicular to the top surface of the first stile and the top surface of the second stile.

Other exemplary embodiments may include a method of producing a cabinet door comprising: routing a first member from a first material, where the routed first member comprises: a center panel; a first stile disposed longitudinally along a left side of the center panel; a second stile disposed longitudinally along a right side of the center panel; a first recess disposed along a top side of the center panel between the first stile and the second stile; machining a second member from a second material, where the machined second member comprises: a first rail; a first rabbet disposed on a back surface along a bottom edge of the first rail; applying an adhesive to the first member and the second member, where the adhesive is not applied to the first recess; applying a veneer to the portions of the first member and the second member where adhesive was applied, where the veneer has a longitudinally extending grain pattern; applying an adhesive to the first recess; fitting the second member into the first recess, where the material at the bottom of the second member may be in direct contact with the material at the first recess; where the longitudinally extending grain pattern of the first member veneer is perpendicular to the longitudinally extending grain pattern of the second member veneer. Optionally, the method may include the step of the routed first member further comprising: a second recess disposed along a bottom side of the center panel between the first stile and the second stile. Additionally, the method may further comprise: machining a third member from a third material, where the machined third member comprises: a second rail; a second rabbet disposed on a back surface along a top edge of the second rail; applying the veneer to the third member; applying the adhesive to the second recess after the veneer is applied; and fitting the third member into the second recess, where the material at the bottom of the third member may be in direct contact with the material at the second recess; where the longitudinally extending grain pattern of the first member veneer is perpendicular to the longitudinally extending grain pattern of the second member veneer and the third member veneer.

In another embodiment of the method, the routing may be by a numerical control (NC) machine where the machining may be by at least of one: a NC machine and a molder. Alternatively, the first material, the second material, and the third material may each be selected from at least one of: medium-density fibreboard (MDF), particleboard, and plywood. Additionally, the method may further comprise the step of the routed first member further comprising: a first profile disposed longitudinally along a portion of the right edge of the first stile between the first recess and the second recess, where the top and bottom of the first profile may be beveled; and a second profile disposed longitudinally along a portion of the left edge of the second stile between the first recess and the second recess, where the top and bottom of the second profile may be beveled; the machined second member may further comprise: a third profile disposed longitudinally along a bottom edge of the first rail, where the left and right of the third profile may be beveled; the machined third member may further comprise: a fourth profile disposed longitudinally along a top edge of the second rail, where the left and right of the fourth profile may be beveled; where the beveled left edge of the third profile may form a miter with the beveled top edge of the first profile, and the beveled right edge of the third profile may form a miter with the beveled top edge of the second profile; and where the beveled left edge of the fourth profile may form a miter with the beveled bottom edge of the first profile, and the beveled right edge of the fourth profile may form a miter with the beveled bottom edge of the second profile. Optionally, the method may further comprise the steps of: sanding, by a sander, at least one of: the first member, the second member, and the third member prior to applying the veneer; and covering, by at least one cover, the first recess and the second recess prior to applying the veneer.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

The disclosed cabinet door assembly creates the appearance of a three-piece or five-piece cabinet door constructed from wood. The stiles and center panel have a veneer with a longitudinally extending grain pattern that is perpendicular to the longitudinally extending grain pattern of the veneer on the rails. Additionally, the corners of any profiles on the cabinet door form miters, where a miter may be a joint made between two pieces of wood or other material at an angle of 90°, such that the line of junction bisects that angle. For example, a miter may be a joint made by beveling each of two parts to be joined, usually at a 45° angle, to form a corner, usually a 90° angle. Recesses in a first member allow for the insertion of top and bottom rails. By creating such recesses without a veneer, it allows the rail to be attached to the first member via a direct same material connection, such as a medium-density fibreboard (MDF) to MDF connection. The application of a veneer to a surface results in areas where the veneer thickness may not be repeatable over multiple doors due to variances in application, materials, and bridging effects. By using recesses where a veneer is not applied, the result is a cabinet door with a greatly increased consistent appearance and tolerances. Accordingly, the height of the rails and the height of the stiles of the cabinet door may consistently align which results in a repeatable, and structurally stronger, construction.

Figure 1:
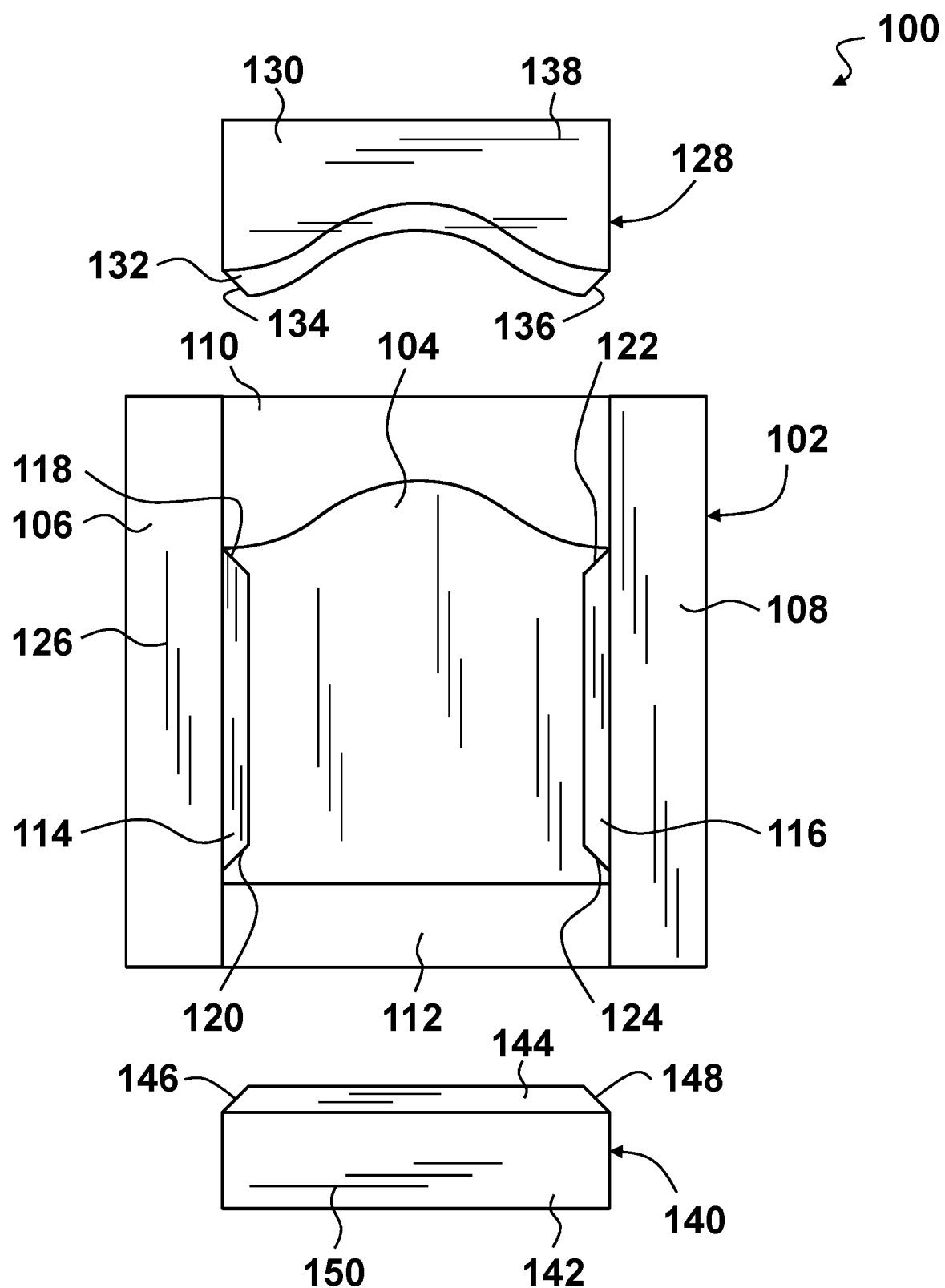
FIG. 1 depicts a top partially exploded view of an exemplary cabinet door.

FIG. 1 depicts a top view of a partially exploded exemplary cabinet door assembly 100. The cabinet door may include a first member 102. The first member 102 may be made from a sheet of one or more materials, e.g., medium-density fibreboard (MDF), particleboard, and/or plywood. The first member 102 may comprise a center panel 104, a first stile 106, a second stile 108, a first recess 110, a second recess 112, a first profile 114, and a second profile 116. The features of the first member (104, 106, 108, 110, 112, 114, 116) may be routed via a numerical control (NC) machine, such as a computer numerical control (CNC) machine.

In some embodiments, the center panel 104 may have a flat surface where the center panel 104 may be raised and/or recessed. The center panel 104 may also be bordered on the sides by one or more of the first stile 106, the second stile 108, the first profile 114, and the second profile 116. The first stile 106 may be disposed longitudinally along a left side of the center panel 104. The second stile 108 may be disposed longitudinally along a right side of the center panel 104. The first profile 114 may be disposed longitudinally along a portion of the right edge of the first stile 106 between the first recess 110 and the second recess 112. The first profile 114 may have a top bevel 118 and a bottom bevel 120. The second profile 116 may be disposed longitudinally along a portion of the left edge of the second stile 108 between the first recess 110 and the second recess 112. The second profile 116 may have a top bevel 122 and a bottom bevel 124. Optionally, the profile bevels (118, 120, 122, 124) may match the bevels on other profiles to form miters (See FIG. 2). The profiles (114, 116, 132, 144) may be rounded, angled, flat, not present, or any other combination or design.

In one exemplary embodiment of the cabinet door assembly, the first member 102 may also include a first veneer 126 having a longitudinally extending grain pattern depicted by grouped parallel lines. The first veneer 126 may cover the center panel 104, the first stile 106, the second stile 108, the first profile 114, and/or the second profile 116. The first veneer 126 may also cover the left and right edges of the first member 102. In some embodiments, the first veneer 126 may also cover the top and bottom edges of the first member 102. The back of the first member 102 may have a pre-applied veneer which may include a solid color and/or a longitudinally extending grain pattern. Any veneer pre-applied to the back of the first member 102 may match the first veneer 126, i.e., any veneer on the back surface may have a longitudinally extending grain pattern parallel to the longitudinally extending grain pattern of the first veneer 126. Alternatively, a veneer pre-applied to the back of the first member 102 may not match, e.g., any veneer on the back surface may be a solid color such as white. The first veneer 126 does not cover the first recess 110 or the second recess 112.

The cabinet door 102 may also include a second member 128. The second member 128 may be made from a sheet of one or more materials, e.g., MDF, particleboard, and/or plywood. The second member 128 may fit into the first recess 110. The second member 128 may include a first rail 130. The second member 128 may also include a third profile 132. The third profile 132 may be disposed longitudinally along a bottom edge of the first rail 130. The third profile may have a left bevel 134 and a right bevel 136. The second member 102 may also include a second veneer 138 having a longitudinally extending grain pattern depicted by a set of parallel lines grouped together. The second veneer 138 may cover the first rail 130 and the third profile 132. The second veneer 138 may also cover a portion of the left and right edges of the second member 128. In some embodiments, the second veneer 138 may cover the top edge of the second member 128. The longitudinally extending grain pattern of the second veneer 138 may be perpendicular to the longitudinally extending grain pattern of the first veneer 126. In some embodiments, the rail may be an arch, straight, or other shape.

The cabinet door assembly 100 may also include a third member 140. The third member 140 may be made from a sheet of one or more materials, e.g., MDF, particleboard, and/or plywood. The first member 108, second member 128, and third member 140 may be machined from a single sheet of material, e.g., a single sheet of MDF. The third member 140 may fit into the second recess 112. Additionally, the third member 140 may include a second rail 142. The third member 140 may also include a fourth profile 144 where the fourth profile 144 may be disposed longitudinally along a top edge of the second rail 142. The fourth profile may also have a left bevel 146 and a right bevel 148. The third member 140 may also include a third veneer 150 having a longitudinally extending grain pattern depicted by grouped parallel lines. The third veneer 150 may cover the second rail 142 and the fourth profile 144. The third veneer 150 may also cover a portion of the left and right edges of the third member 140. In some embodiments, the third veneer 150 may cover the bottom edge of the third member 140. The longitudinally extending grain pattern of the third veneer 150 may be perpendicular to the longitudinally extending grain pattern of the first veneer 126. The longitudinally extending grain pattern of the third veneer 150 may be parallel to the longitudinally extending grain pattern of the second veneer 138. The first veneer 126, second veneer 138, and/or third veneer 150 may be applied at the same time from a single sheet of veneer, such that the longitudinally extending grain pattern is properly arranged in the assembled cabinet door (See FIG. 2). The second member 128 and/or third member 140 may each be respectively positioned against the stiles (106, 108) as a butt joint, miter joint, or any other joint. The second member 128 and/or third member 140 may be rectangular, arched, or any other shape to create various cabinet door designs.

Figure 2:
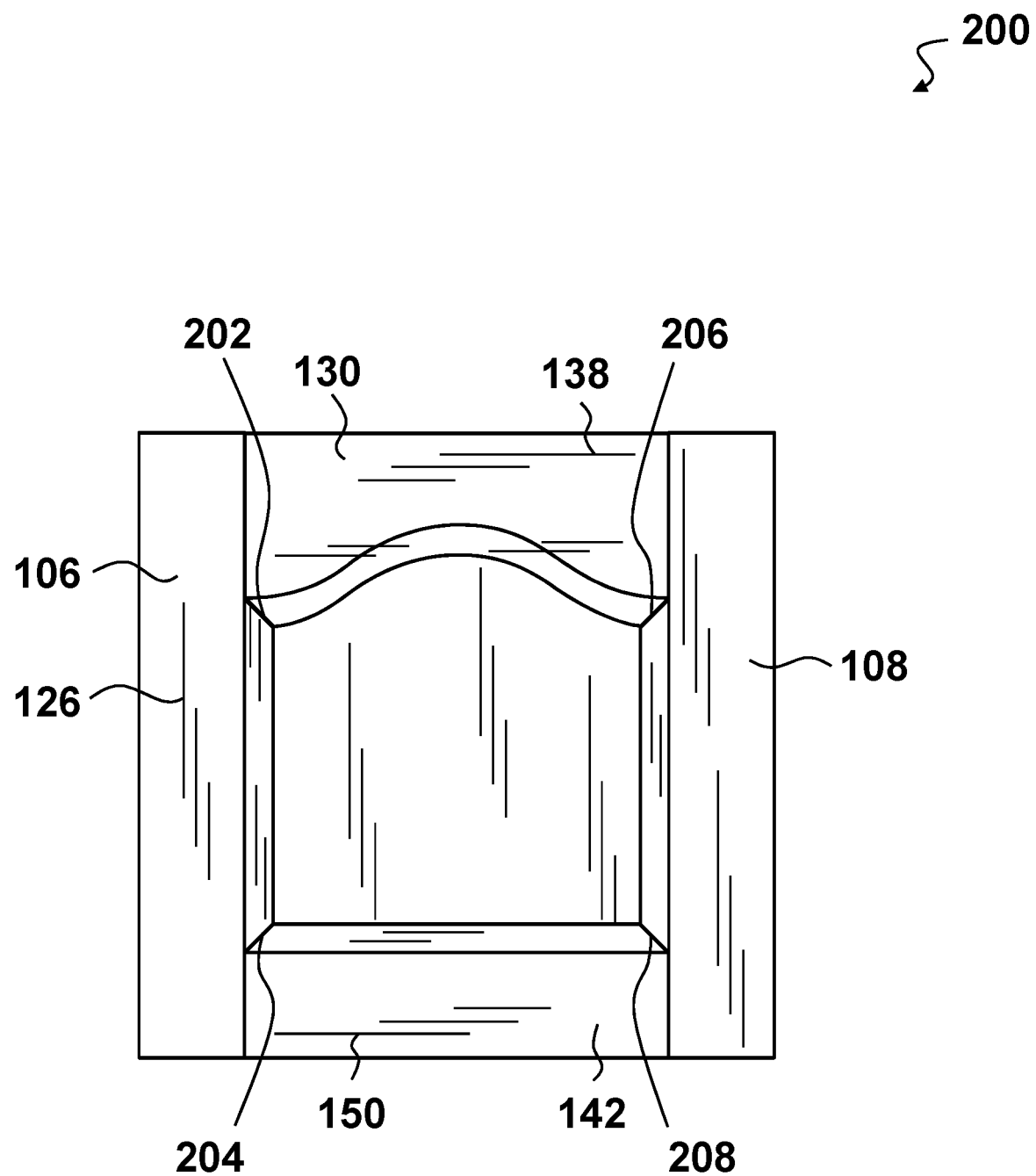
FIG. 2 depicts a top assembled view of the exemplary cabinet door of FIG. 1.

FIG. 2 depicts a top view of the assembled exemplary cabinet door 200 of FIG. 1. The assembled exemplary cabinet door 200 may create the appearance of a three-piece or five-piece cabinet door that may have been constructed from wood. The longitudinally extending grain pattern of the second veneer 138 is parallel to the longitudinally extending grain pattern of the third veneer 150, both of which are perpendicular to the longitudinally extending grain pattern of the first veneer 126. The direction of these longitudinally extending grain patterns may match that of an authentic wood three-piece or five-piece cabinet door. The bevels (118, 132, 120, 146, 122, 136, 124, 148) (See FIG. 1) form miters (202, 204, 206, 208), respectively. The miters (202, 204, 206, 208) create the appearance of two pieces of wood joined together. The top surfaces of the first stile 106, the second stile 108, the first rail 130, and the second rail 142 may all be in the same plane. The first rail 130 may be secured in the first recess 110 (See FIG. 1) by an adhesive and/or a friction fit. The second rail 142 may also be secured in the second recess 112 (See FIG. 1) by an adhesive and/or a friction fit. In an embodiment where the cabinet door is constructed from MDF, an adhesive would form a first MDF-MDF bond between a bottom surface of the first rail 130 and the first recess 110 (See FIG. 1), which is stronger than an MDF-veneer bond or a veneer-veneer bond. The adhesive would also form a first MDF-MDF bond between a bottom surface of the second rail 142 and the second recess 112 (See FIG. 1), which is stronger than an MDF-veneer bond or a veneer-veneer bond.

Figure 3A:
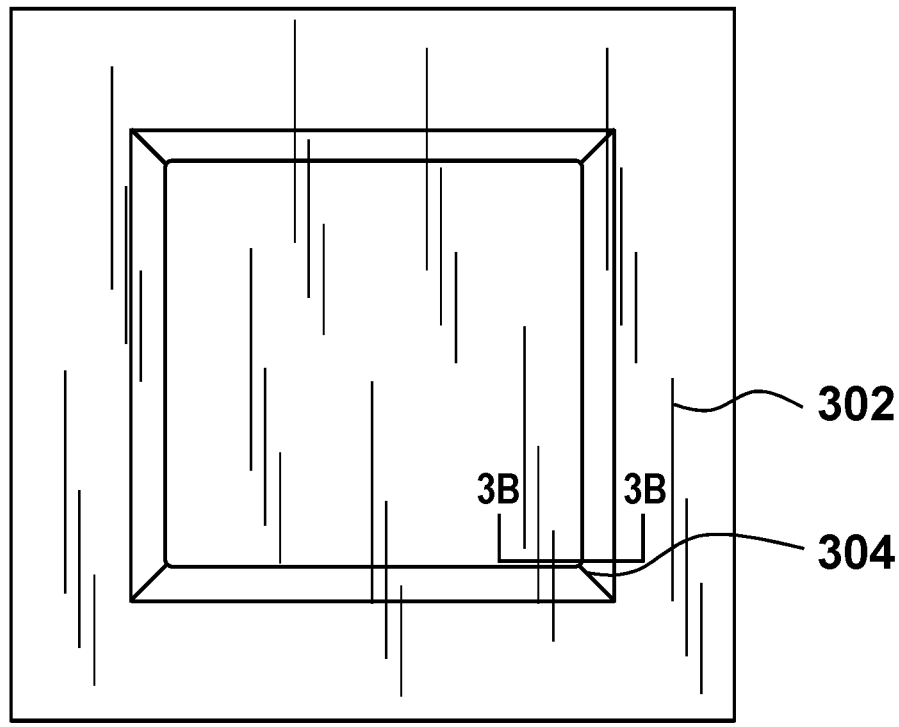
FIG. 3A depicts a top view of a prior art single surface cabinet door.

FIG. 3A depicts a top view of a prior art single surface cabinet door 300. In a single surface cabinet door with a veneer 302, it is readily apparent that the cabinet door 300 is not constructed from wood. The single surface cabinet door 300 may have a single veneer 302 applied over the entire surface with a longitudinally extending grain pattern depicted by grouped parallel lines. The veneer 302 is obviously a veneer 302, because the grain pattern does not change over the surface of the single surface cabinet door 300, i.e., there are no separate rails having a different grain pattern as would be expected in a wood cabinet door. In addition, the veneer cannot fit perfectly into corners, such as corner 304, and instead creates a rounded shape in what is called bridging.

Figure 3B:
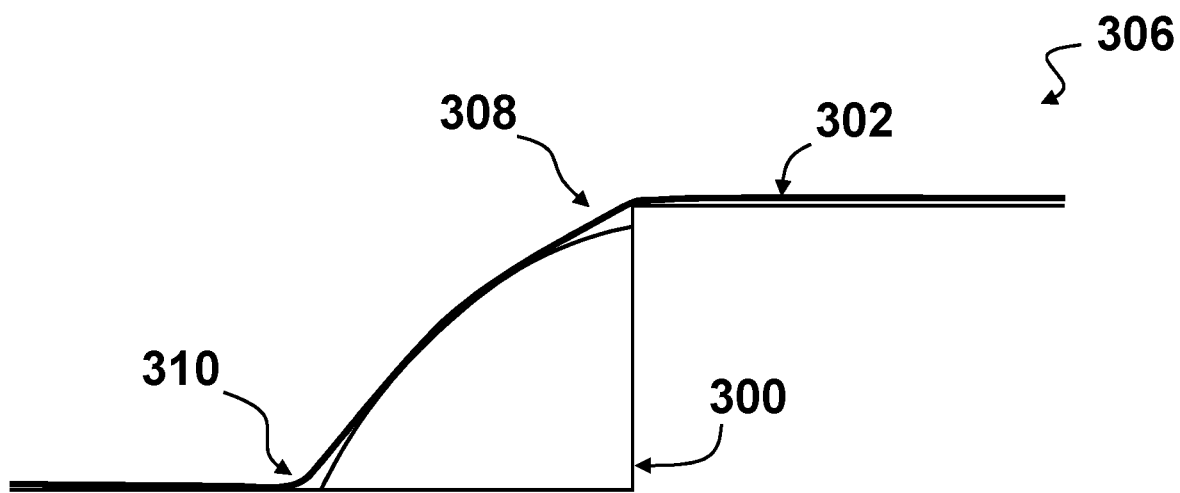
FIG. 3B depicts a cross-sectional view of a single veneer applied over the single surface cabinet door of FIG. 3A.

FIG. 3B depicts a cross-sectional view at a corner of a single veneer applied over the single surface prior art cabinet door 306 of FIG. 3A. The veneer 302 is affixed to the surface of the single surface cabinet door 300. However, the veneer 302 cannot fit perfectly into corners, and causes bridging (308, 310). In the cross-sectional view of the bridging 310 at the corner 304 (See FIG. 3A), the veneer 302 is noticeably rounded due to multiple angles intersecting and this results in a lower quality appearance with higher variations between multiple cabinet doors. This makes it readily apparent that the cabinet door 300 is not constructed from wood.

Figure 4A:
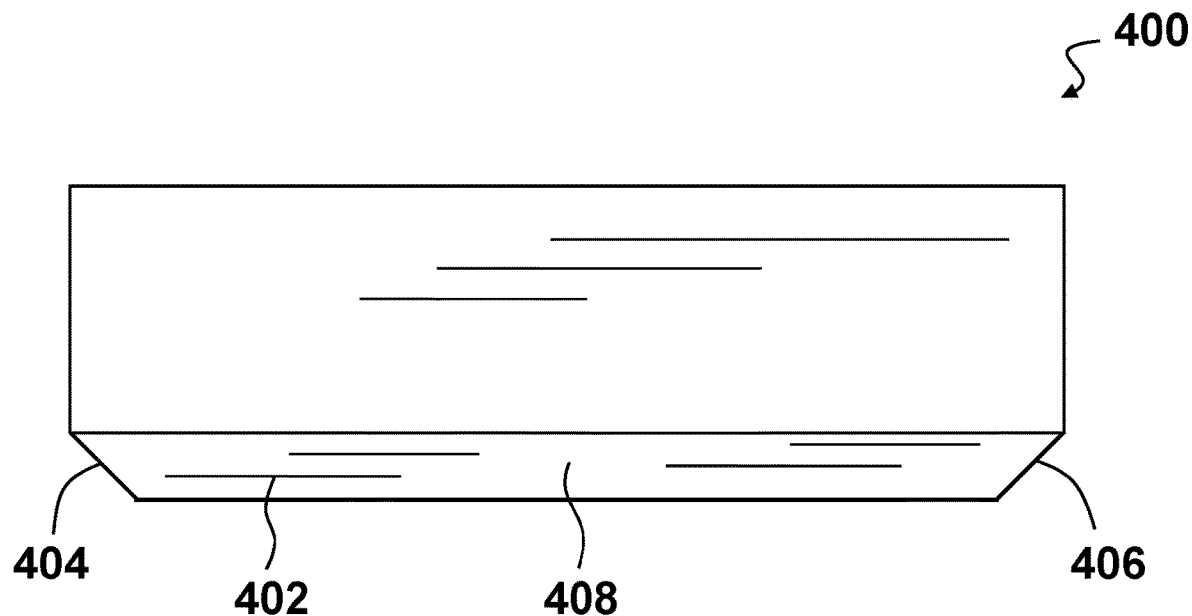
FIG. 4A depicts a top view of an exemplary rail of the exemplary cabinet door of FIG. 1.

FIG. 4A depicts a top view of an exemplary rail 400 of the exemplary cabinet door assembly of FIG. 1. The rail 400 has veneer 402 applied across the top surface with a longitudinally extending grain pattern depicted by grouped parallel lines. The veneer 402 may also be applied to a portion of the left and right sides of the rail 400, as well as a portion of the sides of a left bevel 404 and right bevel 406 of the profile 408. This application of the veneer 402 ensures that any minor variances of the veneer and/or cabinet members does not reveal the material underneath at the miters when assembled (See FIG. 2)

Figure 4B:
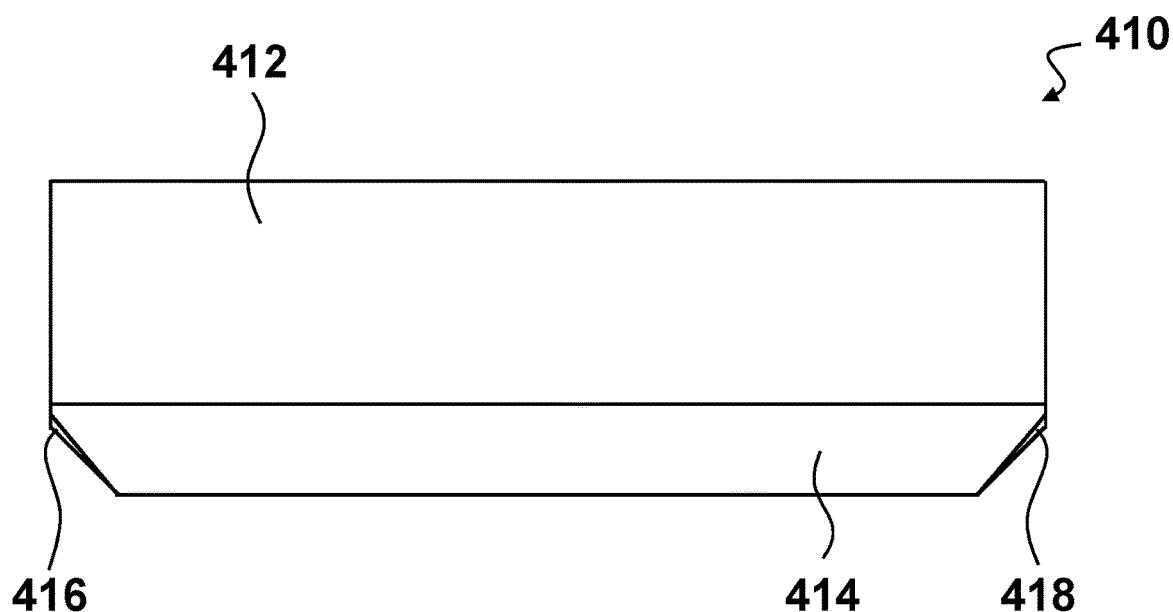
FIG. 4B depicts a bottom view of an exemplary rail of the exemplary cabinet door of FIG. 1.

FIG. 4B depicts a bottom view of an exemplary rail 410 of the exemplary cabinet door assembly of FIG. 1. The bottom surface 412 of the rail and bottom surface 414 of the profile do not necessarily contain veneer and may be made up of exposed material, e.g., MDF. The bottom surface 412 of the rail may have adhesive applied to it to form a direct MDF to MDF bond with a recess (See FIG. 1). The bottom surface 414 of the profile may fit over a veneer of a center panel (See FIG. 1). Only having a single layer of veneer in the area under the profile reduces the likelihood of variances in the veneer outside of desired tolerances. The rail 410 may be beveled back (416, 418) at the bevels (See FIG. 4B), where the beveled back or edge may refer to an edge of the structure that is not perpendicular to the faces of the piece. The bevel back (416, 418) may allow the miter joint (See FIG. 2) to close properly, that is, the veneer isn't allowed to go straight down and making the joint rightly fit. Having bevels perpendicular to a local plane would prevent a clean miter joint due to variances in the application of the veneer. By having the bevel back (416, 418), the appearance of the veneer is preserved while ensuring a proper miter fit.

Figure 5A:
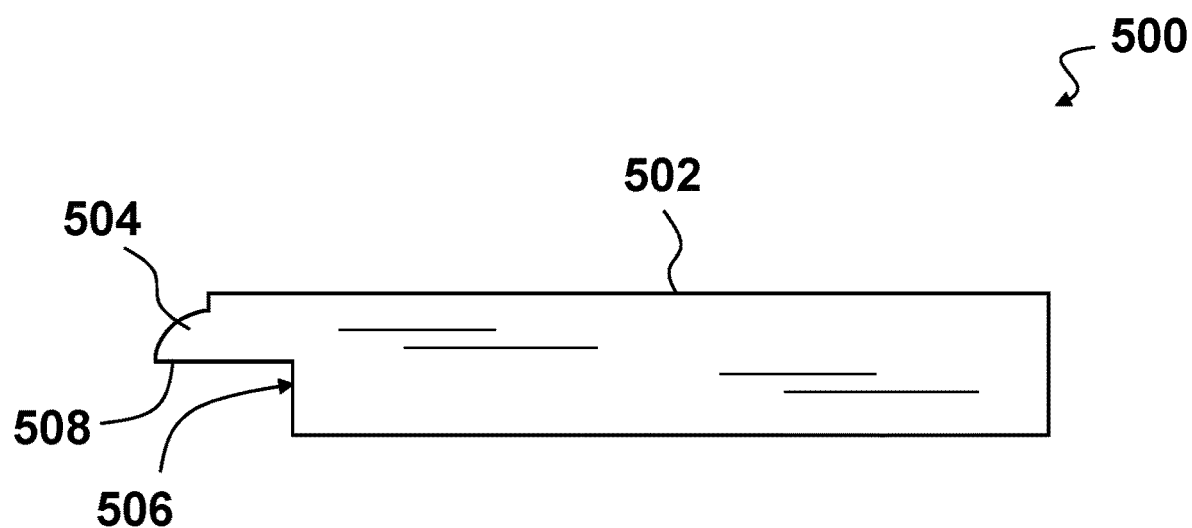
FIG. 5A depicts a right side view of an exemplary rail of the exemplary cabinet door of FIG. 1.
Figure 5B:
FIG. 5B depicts a left side view of an exemplary rail of the exemplary cabinet door of FIG. 1.

FIG. 5A depicts a right side view of an exemplary rail 500 of the exemplary cabinet door assembly of FIG. 1. The rail 502 and profile 504 may have a rabbet 506 disposed along an inner edge of the rail 502 and profile 504. A rabbet 506 may be a recess or groove cut into the edge of a piece of machinable material. When viewed in cross-section, a rabbet is two-sided and open to the edge or end of the surface into which it is cut. The underside of the rabbet 508 may fit over the center panel 104 (See FIG. 1), which may create the appearance of a three-piece and/or five-piece cabinet door constructed from wood. This joint may also create the appearance of a miter thereby preventing unsightly bridging at the corners (See FIGS. 3A-3B). FIG. 5B depicts a left side view of an exemplary rail 510 of the exemplary cabinet door of FIG. 1. In one embodiment, the left side view of the exemplary rail 510 may be a mirror image of the right side view of the exemplary rail 510 (See FIG. 5A).

Figure 6A:
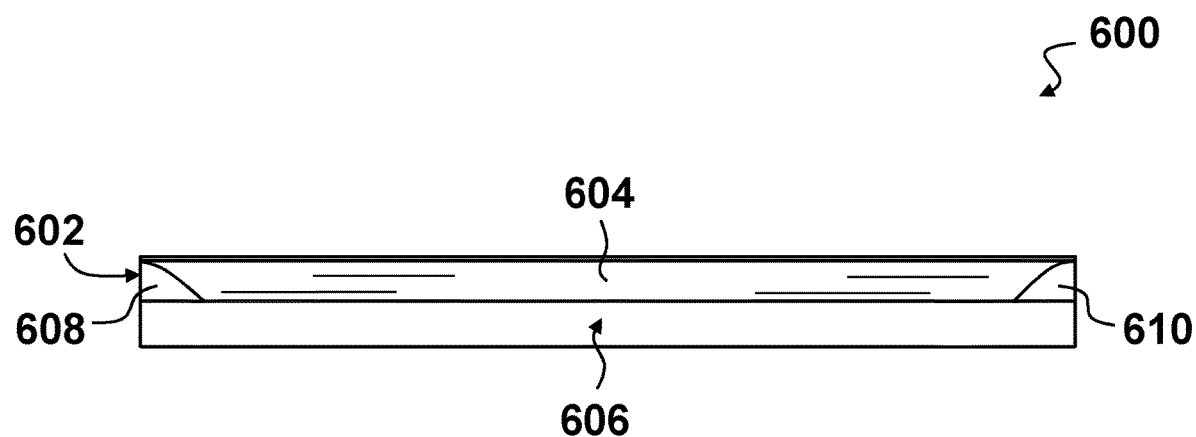
FIG. 6A depicts a front view of an exemplary rail of the exemplary cabinet door of FIG. 1.
Figure 6B:
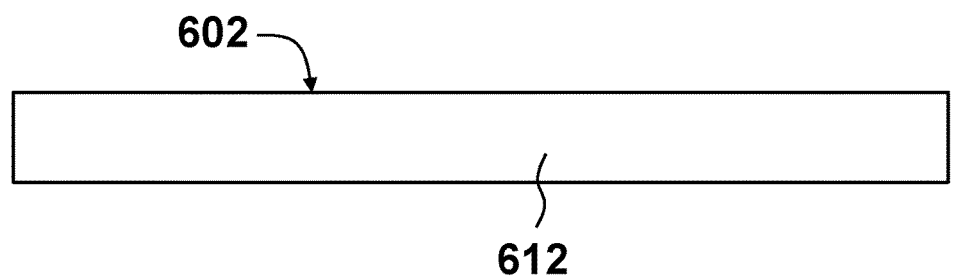
FIG. 6B depicts a rear view of an exemplary rail of the exemplary cabinet door of FIG. 1.

FIG. 6A depicts a front view of an exemplary rail 600 of the exemplary cabinet door of FIG. 1. The rail 602 may include a profile 604 and a rabbet 606. The profile 604 may have a left bevel 608 and a right bevel 610. FIG. 6B depicts a rear view of an exemplary rail 602 of the exemplary cabinet door of FIG. 1. The rail 602 may have a back surface 612 that does not have a veneer, i.e., it is an exposed material such as MDF, particleboard, and/or plywood.

Figure 7A:
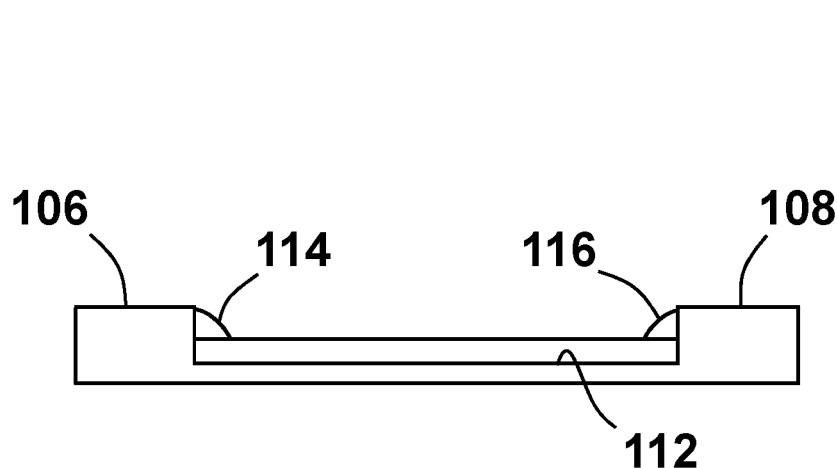
FIG. 7A depicts a rear view of an exemplary cabinet door of FIG. 1 without a rail installed in a recess.
Figure 7B:
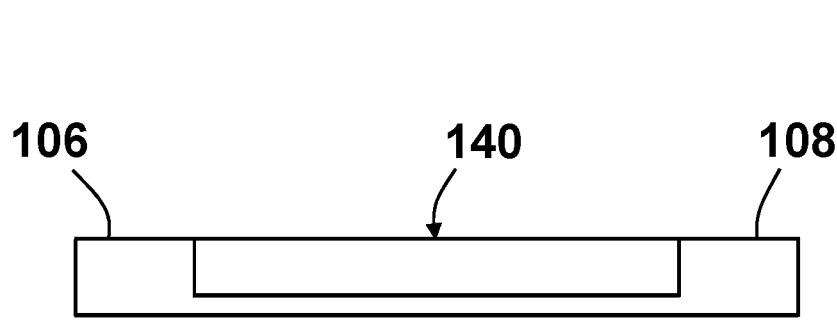
FIG. 7B depicts a rear view of the exemplary cabinet door of FIG. 7A with a rail installed in the recess.
Figure 7C:
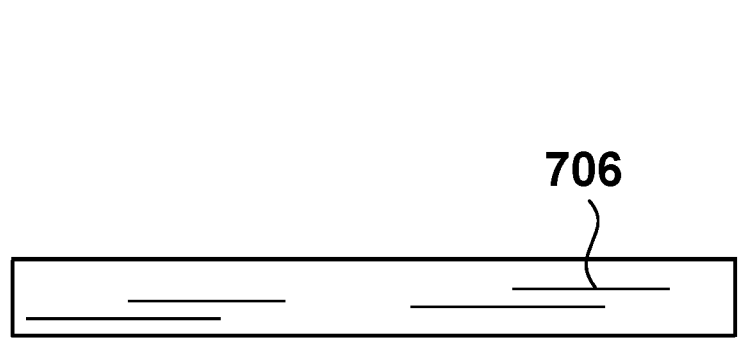
FIG. 7C depicts a rear view of the exemplary cabinet door of FIG. 7B with a veneer applied over the end of the cabinet door.

FIG. 7A depicts a rear view of an exemplary cabinet door assembly 700 of FIG. 1 without a rail installed in a recess. The cabinet door assembly 700 may comprise the first stile 106, the second stile 108, the second recess 112, the first profile 114, and the second profile 116. FIG. 7B depicts a rear view of the exemplary cabinet door assembly 702 of FIG. 7A with a rail installed in the recess. The third member 140 is installed in the cabinet door 702. The height of the third member 140 may be equal to the distance from the second recess 112 (See FIG. 7A) to a top surface of the first stile 106 and a top surface of the second stile 108. In some embodiments, the height of the third member 140 may be greater than, or less than, the distance from the second recess 112 to a top surface of the first stile 106 and a top surface of the second stile 108 if desired for certain cabinet door styles. In some embodiments, the bottom of the first stile 106, the second stile 108, and the third member 140 may not have a veneer, i.e., it is an exposed material such as MDF, particleboard, and/or plywood. In other embodiments, the bottom of the first stile 106, the second stile 108, and the third member 140 may be at least partially covered in a veneer. FIG. 7C depicts a rear view of the exemplary cabinet door of FIG. 7B with a veneer applied over the end of the cabinet door 704. The bottom of the first stile 106, the second stile 108, and the third member 140 may be covered by a single veneer 706 to cover the connection shown in FIG. 7B. The cabinet door may be sanded, e.g., by an edge sander, prior to applying the veneer 706.

Figure 8:
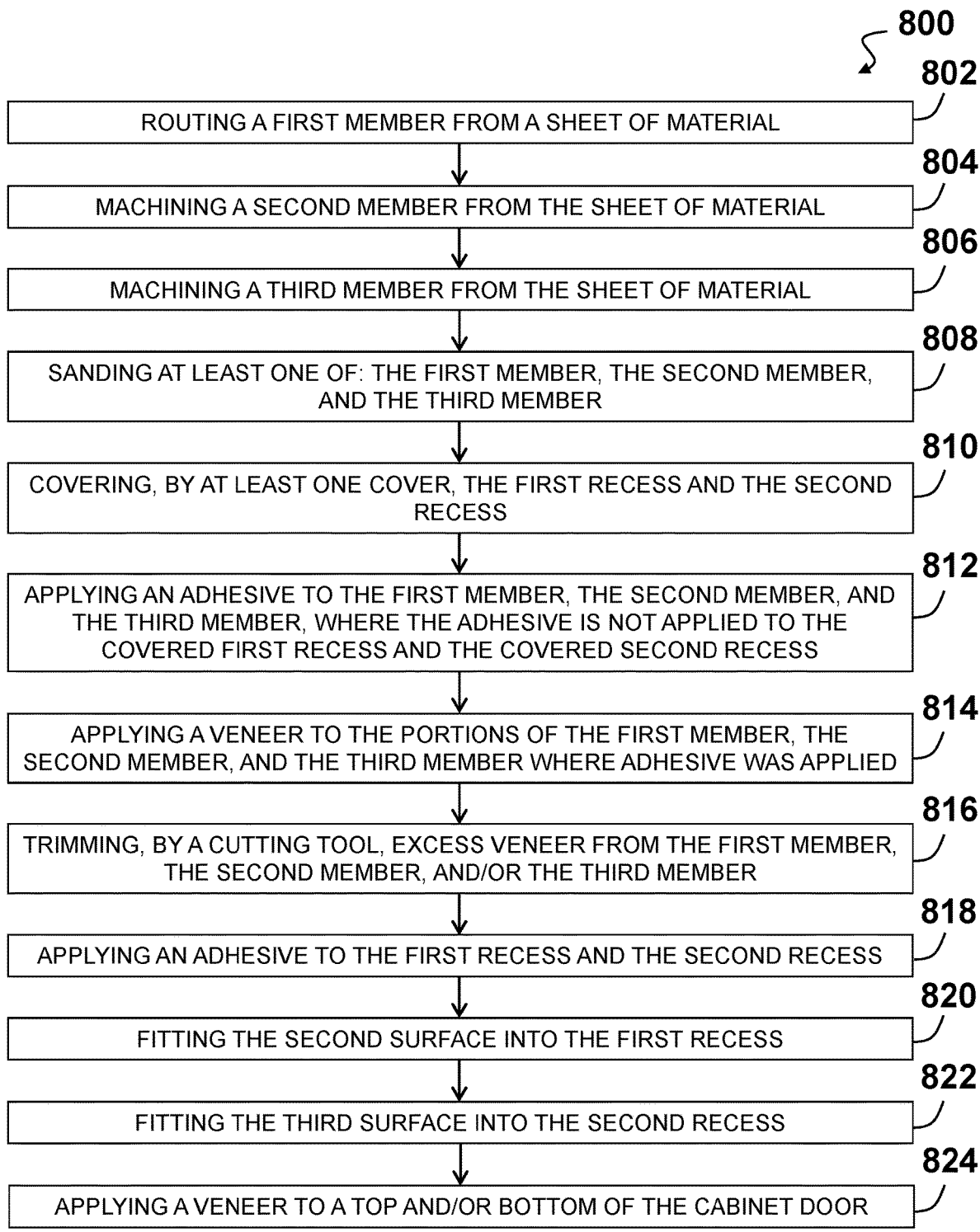
FIG. 8 depicts an exemplary method of producing an exemplary cabinet door.

FIG. 8 depicts an exemplary method 800 of producing an exemplary cabinet door assembly. This method may include routing a first member from a sheet of material (step 802). The routing may be accomplished by a numerical control (NC) machine, such as a computer numerical control (CNC) machine. The material may be selected from at least one of: MDF, particleboard, and/or plywood. The panel and the rails may be routed to glue MDF to MDF or optionally, the panel and the rails may be routed to create a profile on the panel and the rails. The routed first member may include one or more of: a center panel; a first stile disposed longitudinally along a left side of the center panel; a second stile disposed longitudinally along a right side of the center panel; a first recess disposed along a top side of the center panel between the first stile and the second stile; a second recess disposed along a bottom side of the center panel between the first stile and the second stile; a first profile disposed longitudinally along a portion of the right edge of the first stile between the first recess and the second recess, where the top and bottom of the first profile may be beveled; and a second profile disposed longitudinally along a portion of the left edge of the second stile between the first recess and the second recess, where the top and bottom of the second profile may be beveled.

The method 800 may also include machining a second member from the sheet of material (step 804). The machining may be by an NC machine and/or a molder. The machined second member may include one or more of: a first rail, where the height of the first rail may be equal to the distance from the first recess to a top surface of the first stile and a top surface of the second stile; a third profile disposed longitudinally along a bottom edge of the first rail, where the left and right of the third profile may be beveled; and a first rabbet disposed on a back surface along a bottom edge of the first rail and the third profile.

The method 800 may also include machining a third member from the sheet of material (step 806). The machining may be by an NC machine or molder. The machined third member may include one or more of: a second rail, where the height of the second rail may be equal to the distance from the second recess to the top surface of the first stile and the top surface of the second stile; a fourth profile disposed longitudinally along a top edge of the second rail, where the left and right of the fourth profile may be beveled; and a second rabbet disposed on a back surface along a top edge of the second rail and fourth profile. The first member, second member, and/or third member may be routed from a single sheet of material, e.g., a single sheet of MDF. The first member may have a backing veneer which matches a surface veneer or is a solid color, e.g., a solid white backing veneer.

The method 800 may also include sanding at least one of: the first member, the second member, and the third member (step 808). The sanding may be by a sander, such as a power sander or a hand sander. Sanding may be used to selectively remove and/or smooth out any material left from the routing process. The sanding step may be skipped based on the tolerances of the NC machine and/or molder used and/or if an operator determines that sanding is not required.

The method 800 may also include covering, by at least one cover, the first recess and the second recess (step 810). The at least one cover may prevent any adhesive from contacting the first recess and the second recess.

The method 800 may also include applying an adhesive to the first member, the second member, and the third member, where the adhesive is not applied to the covered first recess and the covered second recess (step 812). The adhesive may be applied by a spray gun. The at least one cover may prevent the adhesive from being applied to the first recess and the second recess. The at least one cover may be removed prior to applying a veneer.

The method 800 may also include applying a veneer to the portions of the first member, the second member, and the third member where adhesive was applied (step 814). The veneer may be applied via a press. The veneer may be a Polyvinyl chloride (PVC) foil having a longitudinally extending grain pattern. The veneer may also be made from one or more of: acrylonitrile butadiene styrene (ABS), wood, and paper. The veneer may be applied from a single sheet of veneer and the first member, second member, and/or third member may be arranged such that the longitudinally extending grain pattern of the veneer on the first member is perpendicular to the longitudinally extending grain patterns on both the second member and the third member once the cabinet door is assembled.

The method 800 may also include trimming, by a cutting tool, excess veneer from at least one of: the first member, the second member, and the third member (step 816). The trimming step may be skipped based on the veneer application process and/or if an operator determines that trimming is not required.

The method 800 may also include applying an adhesive to the first recess and the second recess (step 818). The adhesive applied to the first recess and the second recess may be formulated for a bond between the material used, e.g., a MDF to MDF bond, or other material such as: plastic, plywood, etc.

The method may also include fitting the second member into the first recess (step 820). The MDF bottom of the second member may be in direct contact with the MDF of the first recess, where the beveled left edge of the third profile forms a miter with the beveled top edge of the first profile, and the beveled right edge of the third profile forms a miter with the beveled top edge of the second profile.

The method may also include fitting the third member into the second recess (step 822). The MDF bottom of the third member may be in direct contact with the MDF second recess, where the beveled left edge of the fourth profile forms a miter with the beveled bottom edge of the first profile, and the beveled right edge of the fourth profile forms a miter with the beveled bottom edge of the second profile. The longitudinally extending grain pattern of the first member veneer is perpendicular to the longitudinally extending grain pattern of the second member veneer and the third member veneer.

In some embodiments, the method 800 may also include the step of applying a thin strip of veneer to the top and/or bottom of the cabinet door (step 824) (See FIG. 7C). Applying a veneer to the top and/or bottom of the cabinet door may create a smoother finished appearance and hide the connection between the first member, second member, and/ or third member.

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention is herein disclosed by way of examples and should not be limited by the particular disclosed embodiments described above.

What is claimed is:

1. A cabinet door assembly comprising:
a first member, wherein a front side of the first member comprises a center panel, a first stile, a second stile, a first step-shaped recess, and a second step-shaped recess, wherein a rear side of the first member is opposite the front side of the first member, wherein the first member has a rectangular shape, wherein the first stile has a rectangular shape that extends longitudinally along a left side of the first member from a top side of the first member to a bottom side of the first member, wherein the second stile has a rectangular shape that extends longitudinally along a right side of the first member from the top side of the first member to the bottom side of the first member, wherein the first step-shaped recess is open to the front side of the first member and the top side of the first member, and wherein the second step-shaped recess is open to the front side of the first member and the bottom side of the first member;
a first veneer, wherein the first veneer covers the front side of the center panel, the first stile, and the second stile;
an exposed material of the first member, wherein portions of the first member that are not covered by the first veneer are made up of the exposed material, and wherein a front side of the first step-shaped recess and a front side of the second step-shaped recess comprise the exposed material;
a first rail configured to fit into the first step-shaped recess; and
a second rail configured to fit into the second step-shape recess.

2. The cabinet door assembly of claim 1, wherein the first step-shaped recess extends partially through the first member from the front side of the first member toward the back side of the first member.

3. The cabinet door assembly of claim 2, wherein the second step-shaped recess extends partially through the first member from the front side of the first member toward the back side of the first member.

4. The cabinet door assembly of claim 1, wherein the first rail is secured to the first step-shaped recess to form a direct bond between materials selected from at least one of: plywood and wood, and wherein the second rail is secured to the second step-shaped recess to form a direct bond between materials selected from at least one of: plywood and wood.

5. The cabinet door assembly of claim 1, wherein the front side of the first step-shaped recess and the front side of the second step-shaped recess form a plane that is parallel to a plane formed by a front side of the first stile and a front side of the second stile.

6. The cabinet door assembly of claim 1, further comprising a second veneer and a third veneer, wherein the second veneer covers a front side of the first rail, and wherein the third veneer covers a front side of the second rail.

7. The cabinet door assembly of claim 6, wherein a longitudinally extending grain pattern of the first veneer is perpendicular to a longitudinally extending grain pattern on the second veneer and the third veneer once the first rail is fit into the first step-shaped recess and the second rail is fit into the second step-shape recess.

8. The cabinet door assembly of claim 5, wherein a maximum depth of the first rail is less than a maximum depth of the first member, and wherein a maximum depth of the second rail is less than the maximum depth of the first member.

9. The cabinet door assembly of claim 5, wherein the first member further comprises: a first profile disposed longitudinally along a portion of the right edge of the first stile between the first recess and the second recess; and a second profile disposed longitudinally along a portion of the left edge of the second stile between the first recess and the second recess, wherein the second profile is beveled.

10. The cabinet door assembly of claim 9, wherein the first rail further comprises a third profile, wherein a rear side of the first rail contacts the first step-shaped recess, and wherein a rear side of the third profile contacts a front side of the center panel.

11. The cabinet door assembly of claim 10, wherein the second rail further comprises a fourth profile, wherein a rear side of the second rail contacts the second step-shaped recess, and wherein a rear side of the fourth profile contacts the front side of the center panel.

12. The cabinet door assembly of claim 11, wherein the first veneer covers the first profile and the second profile.

13. The cabinet door assembly of claim 12 further comprising: a second veneer and a third veneer, wherein the second veneer covers a front side of the first rail and the third profile, and wherein the third veneer covers a front side of the second rail and the fourth profile.

14. The cabinet door assembly of claim 13, wherein the first profile and the second profile are beveled.

15. The cabinet door assembly of claim 14, wherein the third profile and the fourth profile are beveled.

16. The cabinet door assembly of claim 15, wherein the beveled first profile and beveled second profile form miters with the beveled third profile and beveled fourth profile.

17. The cabinet door assembly of claim 1, wherein the first member, the first rail, and the second rail are each selected from at least one of: medium-density fibreboard (MDF), particleboard, and plywood.

18. The cabinet door assembly of claim 1, wherein a bottom side of the first rail contacts the first step-shaped recess, and wherein an adhesive forms a direct bond between exposed material of the bottom side of the first rail and exposed material of the first step-shaped recess.

19. The cabinet door assembly of claim 1, wherein a bottom side of the second rail contacts the second step-shaped recess, and wherein an adhesive forms a direct bond between exposed material of the bottom side of the second rail and exposed material of the second step-shaped recess.

* * * * *